(No Model.)
W. ARNING.
HOOF PROTECTOR ATTACHMENT FOR HORSESHOES.
No. 362,479. Patented May 10, 1887.
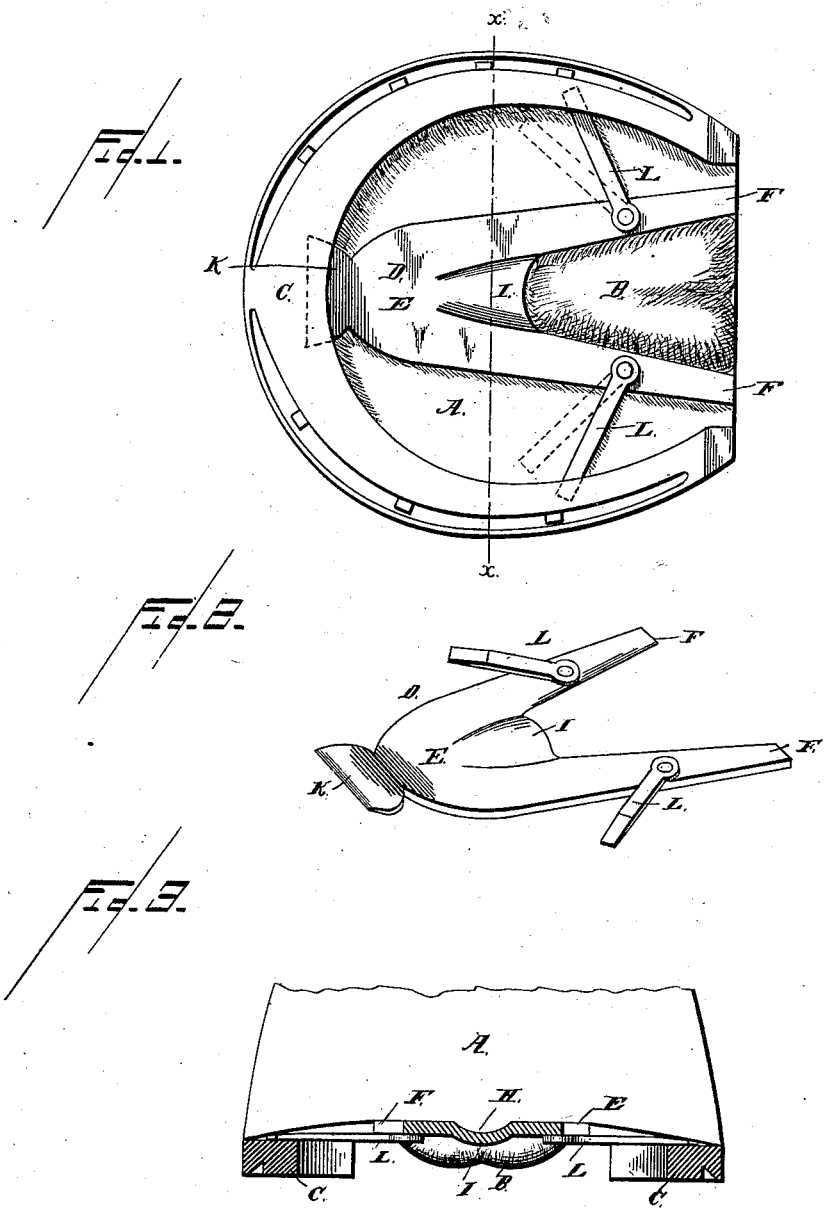

UNITED STATES PATENT OFFICE.

WILLIAM ARNING, OF QUINCY, ILLINOIS.

HOOF-PROTECTOR ATTACHMENT FOR HORSESHOES.

SPECIFICATION forming part of Letters Patent No. 362,479, dated May 10, 1887.

Application filed January 6, 1887. Serial No. 223,587. (No model.)

*To all whom it may concern:*

Be it known that I, WILLIAM ARNING, a citizen of the United States, residing at Quincy, in the county of Adams and State of Illinois, have invented a new and useful Improvement in Hoof-Protector Attachments to Horseshoes, of which the following is a specification.

My invention relates to protectors for horses' hoofs; and it consists in a novel device by which horses' hoofs are protected from nails, glass, &c., which are apt to catch in the hoof and do injury.

The object of my invention is to provide a protector which is neat, fits tightly to the hoof, and may be readily removed therefrom.

In the accompanying drawings, Figure 1 is a bottom plan view of a horse's hoof provided with my improved protector. Fig. 2 is a perspective view of the protector. Fig. 3 is a transverse section on line $x$ $x$ of Fig. 1.

Referring to the drawings, in which similar letters denote corresponding parts in all the figures, A represents a horse's hoof, B the frog thereof, and C the ordinary shoe.

D is the protector, comprising the main body E, having the rearwardly-projecting and outwardly-diverging integral arms F F, which pass on either side of the frog B, and extend to the rear or heel of the hoof. The plate E is hollowed out or recessed in the inner side, as at H, and correspondingly bulged or arched on the outer side, as at I, to receive and protect the front part of the frog. The front end of the plate E is provided with an integral head, K, which is slightly sharpened on the front edge, and adapted to be inserted under the front part of the shoe C.

L L are arms pivoted to the arms F F, at about the middle thereof, having the free ends thereof sharpened and adapted to to be swung out and engaged under the sides of the shoe C.

It will be seen that when the protector is to be removed it is only necessary to swing the pivoted locking-arms L toward the center of the hoof until they are clear of the sides of the shoe, as shown in dotted lines in Fig. 1, when the rear of the protector is raised from the hoof and the projection K drawn outward from under the front part of the shoe.

To replace the protector, the operation is reversed. The projection K is first inserted under the front of the shoe and the arms are pressed down on both sides of the frog of the hoof. The pivoted arms L are then swung out and engaged under the sides of the shoe.

The arched portion I of the main plate E is adapted to pass up over the front end of the frog of the hoof, so as to protect said frog at the most dangerous point.

It will be seen that the protector may be made of any size or shape to fit the hoof, and may also be made to cover a larger proportion of the hoof of the horse, if it be desired. It can also be made from sheet metal or cast metal, as preferred.

My device is very simple and easily applied, may be made very cheaply, and will satisfactorily accomplish the desired purpose.

I am aware that prior to my invention a horseshoe has been provided with a sponge-holder, which is made of a single piece of leather and of a size and shape to conform to the inner sides of the shoe, so as to be sprung in place, and this holder has a depressed portion which extends from the rear edge inwardly toward the center of the holder. I am also aware that a horseshoe-pad has been constructed of two metallic parts, which are each made of wire and flexibly united together at their front ends and inclosed with a rubber which forms the pad, the pad having a V-shaped opening in its rear side to fit around the frog of the horse's foot; but such is not my invention. I am also aware that a horse-hoof has been formed of a single plate of metal, which is adapted to fit between the sides of the horseshoe and leave a small cavity between the latter and the plate to receive and retain a sponge or poultice, and this plate has been held in place by a prong at its front end and by pivoted arms at the sides of the plate near the rear end. My invention differs from these devices in that I provide a rigid non-collapsible metallic plate having integral rigid arms projecting rearwardly from the plate on opposite sides thereof, said arms diverging laterally from each other to fit on opposite sides of the frog of the hoof and bear directly against the same. This rigid non-collapsible plate is further provided with a bulged or arched portion located at the rear end thereof and at a point thereon intermediate the points where the diverging arms join the plate, said depression extending forwardly into the plate. I attach especial importance to the non-collapsible metallic body having the rigid diverging arms at its rear end and the depressed or bulged portion formed in the plate between the arms and extending forwardly into the body of the plate, as I thereby provide means effectually protecting the most tender and dangerous parts of the frog, and the rigid arms prevent the frog from picking up and retaining nails or other metallic substances. To provide for the convenience and ready attachment of the plate to the horseshoe, I sharpen the front end thereof to adapt it to take between the hoof and shoe, and to the rigid arms I pivot folding arms, which take above the rear portions of the horseshoe. I do not, however, wish to be understood as claiming this particular means of holding the plate in place, as I am aware that the same is not new.

Having thus described my invention, what I claim, and desire to secure by Letters Patent of the United States, is—

As a new article of manufacture, a hoof-protector attachment for horseshoes, comprising a rigid non-collapsible plate formed of a single piece of metal having the integral diverging arms projecting rearwardly therefrom, the downwardly-bulged portion I, located at the rear of the plate, with its rear widest end between the points where the diverging arms branch from the plate, and the locking-arms, all arranged and combined substantially as described, for the purpose set forth.

In testimony that I claim the foregoing as my own I have hereto affixed my signature in presence of two witnesses.

WILLIAM ARNING.

Witnesses:
JOHN H. SUNDERMAN,
JOHN BRACKENSICK.